(12) United States Patent
Kanno et al.

(10) Patent No.: US 10,526,987 B2
(45) Date of Patent: Jan. 7, 2020

(54) EXHAUST PURIFICATION DEVICE OF ENGINE

(71) Applicant: Mazda Motor Corporation, Aki-gun, Hiroshima (JP)

(72) Inventors: Masanobu Kanno, Hiroshima (JP); Hiroyuki Nishimura, Higashihiroshima (JP); Kenji Tanimura, Hiroshima (JP); Kenta Ando, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 98 days.

(21) Appl. No.: 15/971,793

(22) Filed: May 4, 2018

(65) Prior Publication Data

US 2018/0347488 A1    Dec. 6, 2018

(30) Foreign Application Priority Data

Jun. 6, 2017 (JP) .................................. 2017-111300

(51) Int. Cl.
| | |
|---|---|
| *F02D 41/02* | (2006.01) |
| *F02D 41/00* | (2006.01) |
| *F01N 3/08* | (2006.01) |
| *F02D 41/40* | (2006.01) |

(52) U.S. Cl.
CPC ....... *F02D 41/0235* (2013.01); *F01N 3/0814* (2013.01); *F01N 3/0842* (2013.01); *F01N 3/0871* (2013.01); *F02D 41/0007* (2013.01); *F02D 41/405* (2013.01); *F01N 2340/06* (2013.01); *F01N 2900/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,157,356 | B2* | 10/2015 | Balthes | F01N 3/023 |
| 9,328,642 | B2* | 5/2016 | Yacoub | F01N 3/0821 |
| 10,378,407 | B2* | 8/2019 | Kanno | F01N 3/0878 |
| 2017/0037786 | A1* | 2/2017 | Fabien | F02B 37/18 |
| 2017/0276045 | A1* | 9/2017 | Zhang | F01N 3/101 |
| 2017/0335755 | A1* | 11/2017 | Xiao | F02B 37/04 |

FOREIGN PATENT DOCUMENTS

JP        H10184418 A      7/1998

* cited by examiner

*Primary Examiner* — Binh Q Tran
(74) *Attorney, Agent, or Firm* — Alleman Hall Creasman & Tuttle LLP (57) ABSTRACT

A $NO_x$ catalyst is provided on an exhaust passage of an engine. The $NO_x$ catalyst reduces the occluded $NO_x$ when an air-fuel ratio of exhaust gas is in the vicinity of a stoichiometric air-fuel ratio or in a richer state than the stoichiometric air-fuel ratio. Turbocharging is executed by turbochargers. In a low load region within the reduction execution region, a target air-fuel ratio is achieved, as required for $NO_x$ reduction, by air amount adjustment with an air amount control valve provided on an intake passage. Since a large amount of air is needed in the high load region within the reduction execution region, the target air-fuel ratio is achieved by air amount adjustment using turbocharging pressure control.

5 Claims, 6 Drawing Sheets

EXHAUST PURIFICATION DEVICE OF ENGINE

FIELD OF THE INVENTION

The present invention relates to an exhaust purification device of an engine.

BACKGROUND ART

In one type of engine, a $NO_x$ catalyst provided on an exhaust passage occludes $NO_x$ in exhaust gas when an air-fuel ratio of exhaust gas is in a leaner state than a stoichiometric air-fuel ratio and reduces the occluded $NO_x$ when the air-fuel ratio of exhaust gas is in a richer state than the stoichiometric air-fuel ratio. In PATENT DOCUMENT 1, it is disclosed that a $NO_x$ reduction control is executed by reducing the air amount and enriching the air-fuel ratio of exhaust gas when the occluded $NO_x$ in the $NO_x$ catalyst is equal to or greater than a predetermined value.

RELATED ART

Patent Document

PATENT DOCUMENT 1 Japanese Unexamined Patent Application Publication No. HEI 10-184418

SUMMARY OF THE INVENTION

Problems to be Solved by the Invention

When a $NO_x$ reduction control ($DeNO_x$ control) is executed, an air-fuel ratio of exhaust gas is enriched by reducing the air amount and performing post injection of fuel. Then, as a region of executing the $NO_x$ reduction control, a predetermined reduction execution region is set using at least engine load as a parameter.

In a low load region within the reduction execution region, responsiveness for enriching the air-fuel ratio of the exhaust gas is required. On the other hand, in a high load region within the reduction execution region, increasing the air amount is required in order to suppress the generation of soot associated with the increase in the main injection amount. However, under the circumstances, the actual situation is that both of these demands in the low load region and in the high load region are not satisfied sufficiently.

The present invention is made in consideration of the above situations, and the purpose is to provide an exhaust purification device of an engine so as to sufficiently satisfy both the reliable achievement of the target air-fuel ratio in the low load region and the obtainment of the sufficient air amount in the high load region when executing the $NO_x$ reduction control.

BRIEF SUMMARY OF THE INVENTION

In order to achieve the above purpose, the present invention adopts configurations as follows. An exhaust purification device of an engine is provided, including a fuel injection valve for supplying fuel to an engine, an air amount control valve for adjusting an air amount supplied to the engine, a turbocharger, a turbocharge control valve for adjusting the air amount by adjusting a turbocharging state of the turbocharger, and a $NO_x$ catalyst provided on an exhaust passage of the engine for occluding $NO_x$ in exhaust gas when an air-fuel ratio of the exhaust gas is in a leaner state than a stoichiometric air-fuel ratio and for reducing the occluded $NO_x$ when the air-fuel ratio of the exhaust gas is in the vicinity of the stoichiometric air-fuel ratio or in a richer state than the stoichiometric air-fuel ratio. When a $NO_x$ reduction condition is met, a processor executes a $NO_x$ reduction control program that performs a $NO_x$ reduction control that sets the air-fuel ratio of the exhaust gas to a target air-fuel ratio at which the occluded $NO_x$ in the $NO_x$ catalyst is reducible and reduces the occluded $NO_x$ in the $NO_x$ catalyst. The $NO_x$ reduction condition is set to be when an operating state of the engine is in a reduction execution region determined at least based on an engine load, the reduction execution region being divided into a low load region and a high load region in advance. The $NO_x$ reduction control program controls the air-fuel ratio of the exhaust gas to achieve the target air-fuel ratio by adjusting the air amount with the air amount control valve when the engine load is in the low load region, and controls the air-fuel ratio of the exhaust gas to achieve the target air-fuel ratio by adjusting the air amount with the turbocharge control valve when the engine load is in the high load region.

According to the above configuration, in the low load region within the reduction execution region, since the air-fuel ratio for $NO_x$ reduction is enriched by air amount adjustment with the air amount control valve, the responsiveness can be sufficiently ensured. Moreover, in the high load region within the reduction execution region, since the air-fuel ratio for $NO_x$ reduction is enriched by air amount adjustment with the turbocharge control valve, the required air amount can be sufficiently obtained.

Further to the above described configuration, the $NO_x$ reduction control program maintains the air amount control valve fully opened when the engine load is in the high load region, and performs a control to reduce the air amount by controlling the air amount control valve to move in a valve closing direction when the engine load is in the high load region and a turbocharging pressure is equal to or greater than a predetermined value above a target turbocharging pressure, which is set according to the operating state of the engine. In this case, when the turbocharging pressure that has a high possibility to generate displacement from the target air-fuel ratio becomes excessive, reducing the air amount with the air amount control valve having good responsiveness can prevent deviation from the target air-fuel ratio beforehand, and returning in an early stage to the target air-fuel ratio is possible even after deviating from the target air-fuel ratio.

The $NO_x$ reduction control program performs a post injection, which is a fuel injection in an expansion stroke, by the fuel injection valve, and also performs a control to reduce a post injection amount of the post injection when the engine load is in the high load region and the turbocharging pressure becomes equal to or greater than the predetermined value above the target turbocharging pressure, which is set according to the operating state of the engine. In this case, by enriching the air-fuel ratio required for $NO_x$ reduction by using the post injection without increasing the post injection unnecessarily, it is preferable to suppress the fuel economy deterioration.

The $NO_x$ reduction control program performs the reduction of the post injection amount when the engine load is in the high load region and also the turbocharging pressure becomes equal to or greater than the predetermined value above the target turbocharging pressure, on a condition that the air-fuel ratio of the exhaust gas is leaner than the target air-fuel ratio. In this case, it is preferable to suppress the fuel economy deterioration by reducing the post injection amount.

The $NO_x$ reduction control program performs the reduction of the post injection amount when the engine load is in the high load region and also the turbocharging pressure becomes equal to or greater than the predetermined value above the target turbocharging pressure, on a condition that the air-fuel ratio of the exhaust gas is leaner than the target air-fuel ratio and richer than a stoichiometric air-fuel ratio. In this case, it is preferable to certainly maintain enrichment of the air-fuel ratio required for $NO_x$ reduction while suppressing the fuel economy deterioration by decreasing the post injection.

Effects of the Invention

According to the present invention, when executing the $NO_x$ reduction control, both the reliable achievement to the target air-fuel ratio in the low load region and the obtainment of the sufficient air amount in the high load region can be satisfied sufficiently.

DETAILED DESCRIPTION OF THE EMBODIMENTS

Figure 1:
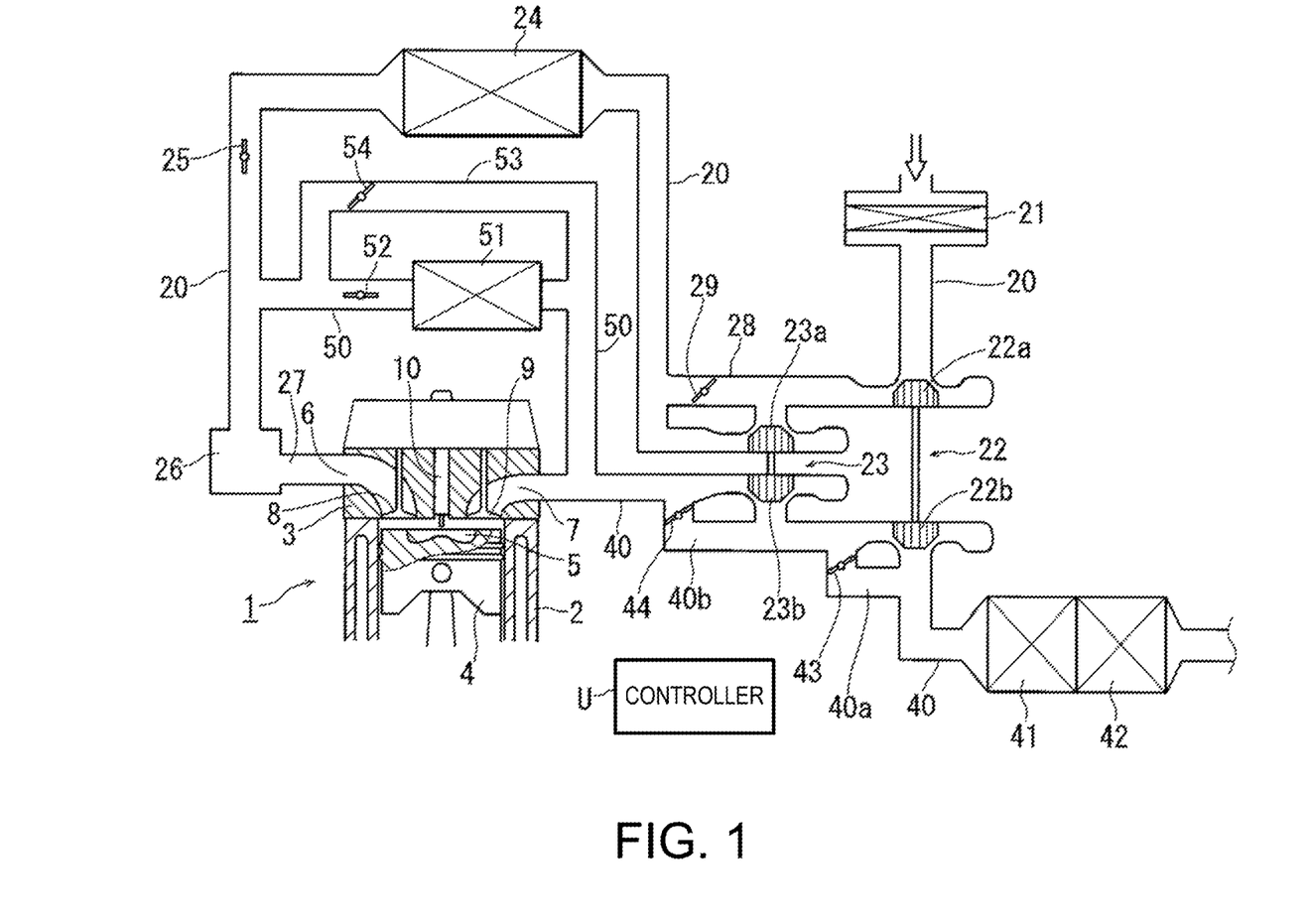
FIG. 1 is a diagram showing one example of an engine to which the present invention is applied.

In FIG. 1, 1 is an engine (engine main body), and an in-line four-cylinder diesel engine for an automobile in this embodiment. As is well known, the engine 1 has cylinders 2, a cylinder head 3, and a piston 4. An intake port 6 and an exhaust port 7 are opened to a combustion chamber 5 that is formed on upward of the piston 4. The intake port 6 is opened and closed by an intake valve 8, and the exhaust port 7 is opened and closed by an exhaust valve 9. A fuel injection valve 10 is mounted on the cylinder head 3 facing the combustion chamber 5. Moreover, in the embodiment, as a common rail type fuel injection, an extremely high pressure fuel is injected from the fuel injection valve 10.

On an intake passage 20 that connects to the intake port 6, an air cleaner 21, a compressor wheel 22a of a large turbocharger 22, a compressor wheel 23a of a small turbocharger 23, an intercooler 24, an air amount control valve (throttle valve) 25, and a surge tank 26 are sequentially arranged from the upstream side thereof toward the downstream side thereof. The surge tank 26 and each cylinder (of each intake port 6) are individually and independently connected by a branch intake air passage 27.

A bypass passage 28 is provided on the intake passage 20. The upstream side end of the bypass passage 28 is opened to the intake passage 20 between the compressor wheels 22a and 23a. Moreover, the downstream side end of the bypass passage 28 is opened to the intake passage 20 between the compressor wheel 23a and the intercooler 24. A control valve 29 (i.e., a turbocharge control valve) is provided on the bypass passage 28.

On an exhaust passage 40 that connects to the exhaust port 7, a turbine wheel 23b of the small turbocharger 23, a turbine wheel 22b of the large turbocharger 22, a $NO_x$ catalyst 41, and a diesel particulate filter (DPF) 42 are connected sequentially from the upstream side thereof toward the downstream side thereof.

A waste gate passage 40a bypassing the turbine wheel 22b is formed on the exhaust passage 40, and a waste gate valve 43 is provided to the waste gate passage 40a. Moreover, a bypass passage 40b bypassing the turbine wheel 23b is formed on the exhaust passage 40, and a control valve 44 is provided on the bypass passage 40b. Furthermore, the downstream end of the bypass passage 40b connects to the exhaust passage 40 at a location between the downstream side of the turbine wheel 23b and the upstream end of the bypass passage 40a.

The intake passage 20 and the exhaust passage 40 are connected via an exhaust gas recirculation (EGR) passage 50. The upstream side end of the EGR passage 50 connects with the exhaust passage 40 at a location that is on the upstream side end of the turbine wheel 23b. Moreover, the downstream side end of the EGR passage 50 connects to the intake passage 20 at a location between the surge tank 26 and the air amount control valve 25.

An EGR cooler 51 is connected to the EGR passage 50 and also an EGR valve 52 is arranged on the downstream side of the EGR cooler 51. A bypass passage 53 bypassing the EGR cooler 51 is provided on the EGR passage 50. The upstream side end of the bypass passage 53 connects to the EGR passage 50 at a location that is on the upstream side of the EGR cooler 51, and the downstream side end thereof connects to the EGR passage 50 on the downstream side of the EGR valve 52. An EGR valve 54 is provided on the bypass passage 53.

Next, a region in which the $NO_x$ reduction control ($DeNO_x$ control) is executed, i.e., a reduction execution region, will be described with reference to FIG. 2. The $NO_x$ reduction control is executed in the hatched region in FIG. 2 with engine speed and engine load as parameters. The $DeNO_x$ control execution region is also a region in which turbocharging is executed. Moreover, turbocharging is executed by mainly the small turbocharger 23 during the low rotation speed of the engine (the control valve 29 is closed at this time) and is executed by mainly the large turbocharger 22 during the high rotation speed of the engine (the control valve 29 is opened at this time).

Figure 2:
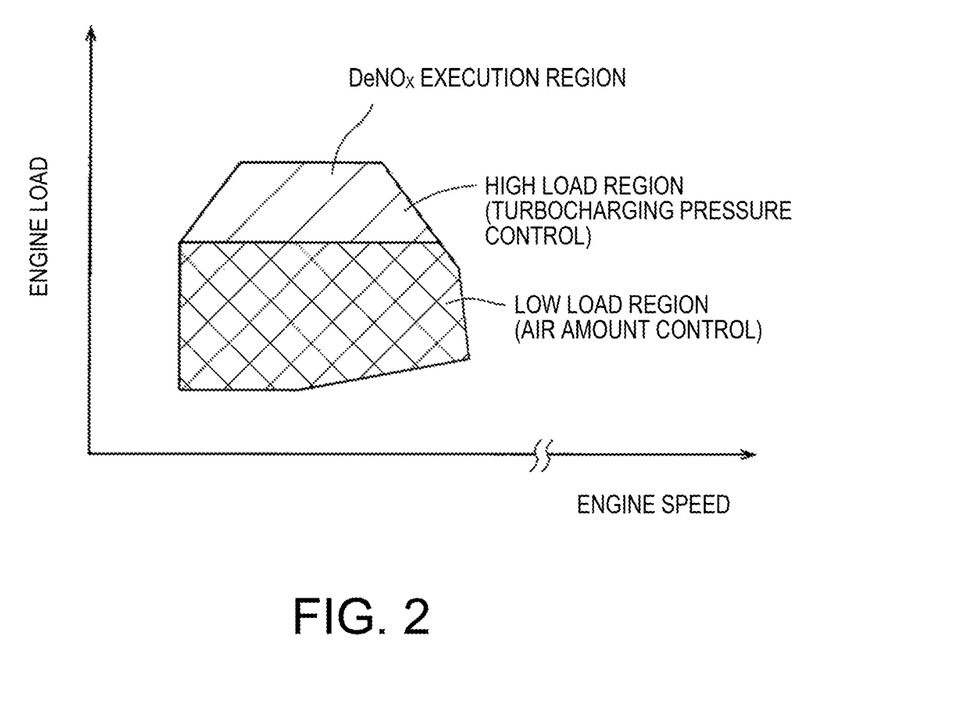
FIG. 2 shows a setting example of an execution region of the $DeNO_x$ control.

The engine load range set by the reduction execution region shown in FIG. 2 is divided into a low load region and a high load region by a predetermined load value in advance. Moreover, in the low load region, the air amount adjustment used to achieve the air-fuel ratio of exhaust gas to the target air-fuel ratio required for the $NO_x$ reduction is executed by the opening degree adjustment of the air amount control valve 25. On the other hand, in the high load region, the air amount adjustment used to achieve the air-fuel ratio of exhaust gas to the target air-fuel ratio required for the $NO_x$ reduction is executed by the air amount adjustment by adjusting the turbocharge state.

The reduction execution region is a region in which mainly turbocharging is executed by the small turbocharger 23. Because of this, the air amount adjustment by the turbocharging pressure control as a turbocharge state is executed by the opening degree adjustment of the control valve 29. Moreover, the air amount adjustment by a turbocharging pressure adjustment can be executed by the opening degree adjustment of the control valve 44; however, from the point of view of responsiveness, it is preferable to be executed by the opening degree adjustment of the control valve 29.

DeNO$_x$ control is set to be executed when all of the following execution conditions to execute the DeNO$_x$ control are satisfied: the NO$_x$ occluded amount in the NO$_x$ catalyst 41 is equal to or greater than the predetermined upper limit value, engine operation is in the reduction execution region shown in FIG. 2, the engine coolant temperature is equal to or greater than the predetermined temperature, the exhaust gas temperature is equal to or greater than the predetermined temperature, the NO$_x$ catalyst 41 is equal to or greater than the predetermined temperature. However, the execution conditions are not limited to these, and can be set appropriately.

The DeNO$_x$ control is started when the NO$_x$ occluded amount in the NO$_x$ catalyst 41 becomes equal to or greater than the predetermined upper limit value and is kept executing until the NO$_x$ occluded amount in the NO$_x$ catalyst 41 becomes substantially zero. However, alternatively the DeNO$_x$ control could be stopped with a state that the NO$_x$ occluded amount in the NO$_x$ catalyst 41 is reduced by the lower limit value which is greater than zero.

Moreover, the detection (or estimation) of the NO$_x$ occluded amount in the NO$_x$ catalyst 41 can be done by a well-known suitable method. For example, the NO$_x$ occlude amount can be estimated by using a sensor for detecting the NO$_x$ occluded amount or accumulating data showing the drive state of the engine.

When performing the DeNO$_x$ control, a post injection is executed in addition to a main injection for obtaining a required torque. This post injection is executed during the expansion stroke so as to combust in the cylinder for the suppression of unburned fuel in the exhaust in the cylinder and the suppression of oil dilution, and more specifically is executed in the first half of the expansion stroke. Moreover, an EGR is executed in order to prevent or suppress the generation of soot during the DeNO$_x$ control (the opening degree of the EGR valve is sustained constantly). Exhaust gas reflux by the EGR execution delays the ignition of fuel injected by post injection, which provides time for fuel injected by post injection to be combusted (helping to ensure that fuel injected by post injection is ignited when air and fuel are mixed properly).

Figure 3:
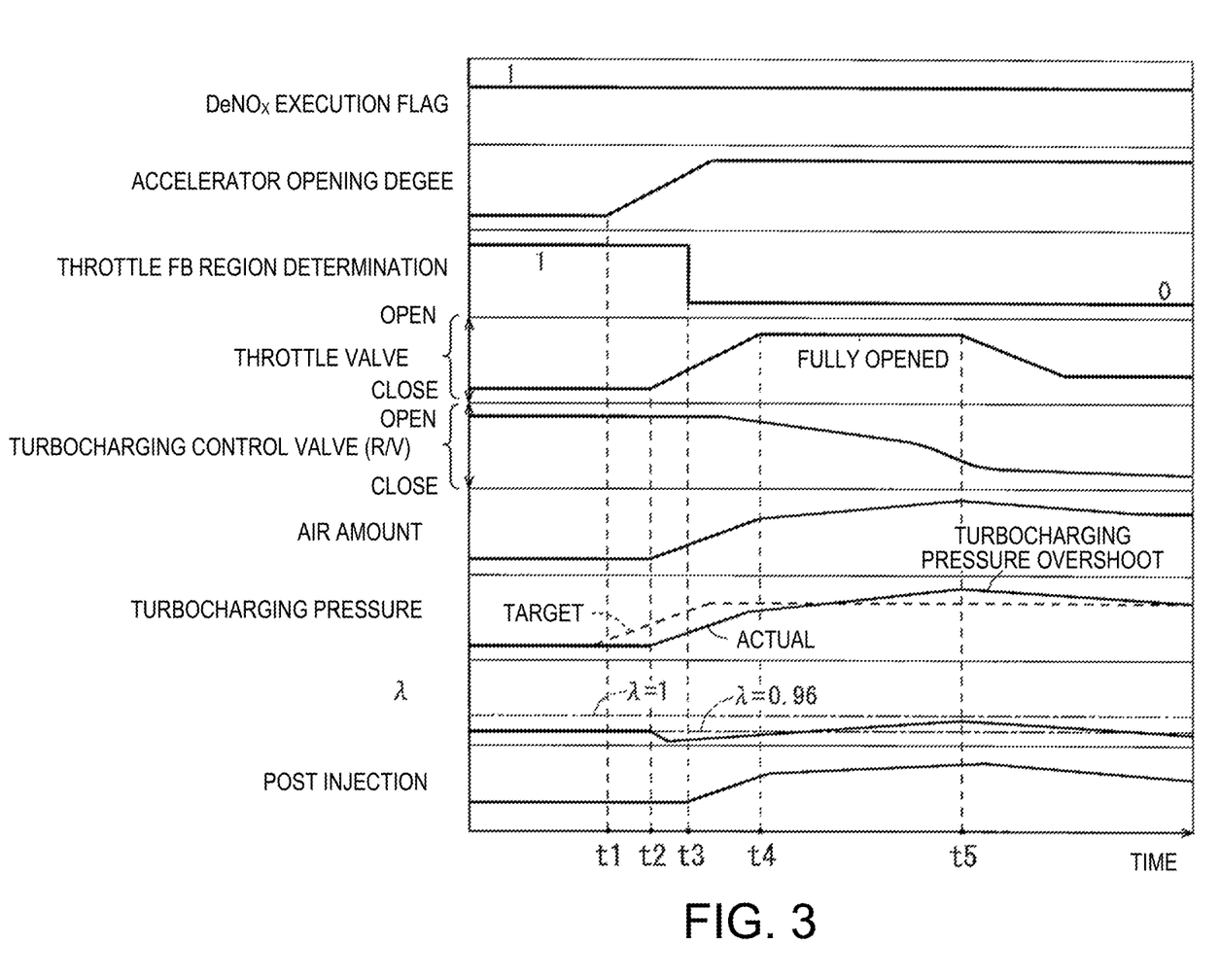
FIG. 3 is a time chart showing control contents of the present invention.

Next, with reference to the time chart in FIG. 3, the DeNO$_x$ control will be described by focusing on the air amount adjustment by the air amount control valve 25 and the turbocharging pressure adjustment by the control valve 29 (the air amount adjustment associated with the turbocharging pressure adjustment). Moreover, in FIG. 3, when a flag for determination of the throttle feedback (FB) region is "one," it indicates the low load region within the reduction execution region in FIG. 2, and when the flag is "zero," it indicates the high load region within the reduction execution region in FIG. 2.

First, by a time point t1, the accelerator opening degree is small and it is the low load region within the reduction execution region shown in FIG. 2. The air-fuel ratio of exhaust gas is maintained to be the target air-fuel ratio required for the NO$_x$ reduction by adjusting the air amount by the opening degree adjustment of the air amount control valve 25 (via feedback control). Moreover, in this embodiment, the target air-fuel ratio is set to 0.96, which is smaller than 1, according to which an excess air ratio $\lambda$ is smaller than the stoichiometric air-fuel ratio (achieving the rich side). Furthermore, the turbocharging pressure is maintained to the target turbocharging pressure that is set according to the operating state of the engine (via feedback control).

The accelerator opening degree is increased from a time point t2, the engine load is gradually increased, and presently at a time point t3, the determination flag of the throttle FB region is changed from one to zero. According to this, from a time point t3, while the post injection amount is increased, the opening degree of the air amount control valve 25 is gradually increased and is fully opened eventually. On the other hand, the turbocharging pressure is gradually increased by the opening degree adjustment of the control valve 29. In this process, after the actual air-fuel ratio of exhaust gas is displaced to more on the rich side than the target air-fuel ratio, the air-fuel ratio of exhaust gas is changed toward the target air-fuel ratio by the air amount increment by increasing the turbocharging pressure. Moreover, a time point that the air amount control valve 25 is fully opened is a time point t4.

After the time point t4, the air amount of exhaust gas is controlled to achieve the target air-fuel ratio by adjusting the air-fuel ratio by the turbocharging pressure adjustment. In the present embodiment, a region is from $\lambda=0.96$, which achieves the target air-fuel ratio, to $\lambda=1$, which achieves the stoichiometric air-fuel ratio is an allowable region.

At a time point t5, it shows an overshoot time that the turbocharging pressure is equal to or greater than a predetermined value more than the target turbocharging pressure. By an air amount increase associated with overshoot of the turbocharging pressure, the air-fuel ratio of exhaust gas may be leaner than the target air-fuel ratio temporarily. In this case, in order to suppress the increase of the post injection amount caused by the increase of the air amount, the post injection amount based on the air amount is decreased (preventing the deterioration of fuel economy). The decrease of the post injection amount when the turbocharging pressure overshoots is executed on a condition that the air-fuel ratio of exhaust gas is leaner than the target air-fuel ratio, and also on a condition that the air-fuel ratio of exhaust gas is richer than the stoichiometric air-fuel ratio.

From a time point t5 when overshoot of the turbocharging pressure is generated as described above, the opening degree of the air amount control valve 25 is decreased and overshoot is promptly converged (the actual turbocharging pressure is converged to the target turbocharging pressure).

Figure 4:
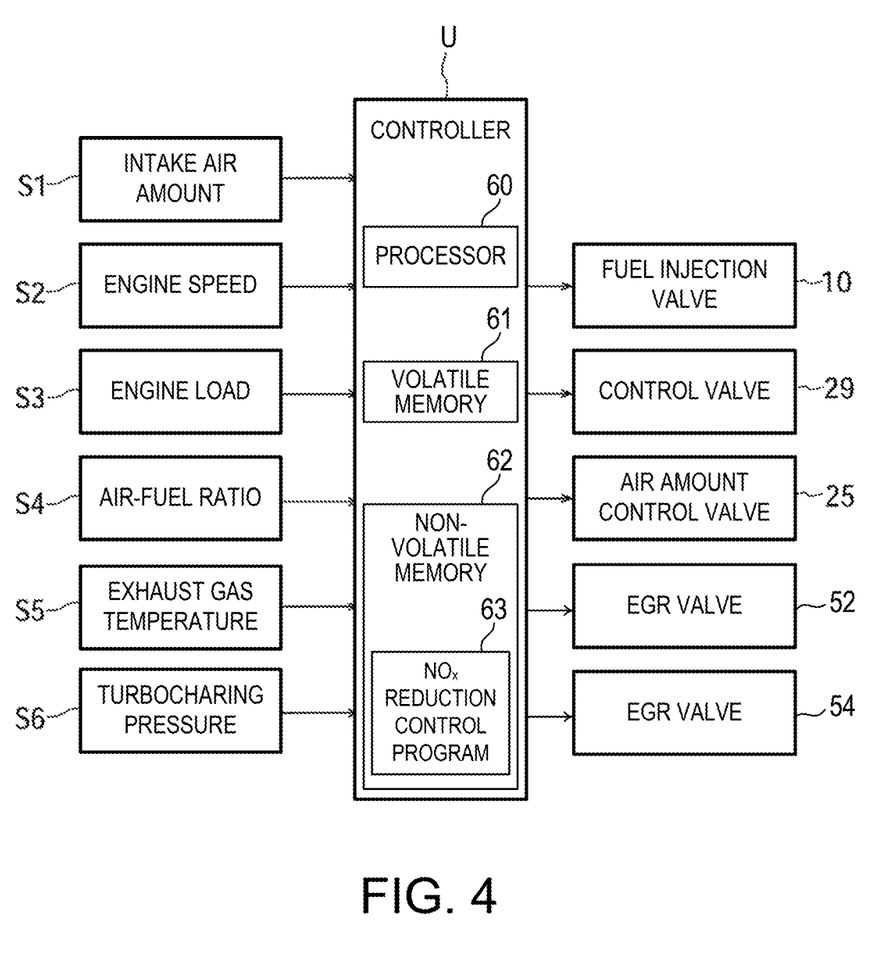
FIG. 4 is a block diagram showing an example of a control system of the present invention.

FIG. 4 shows an example of a control system for executing the DeNO$_x$ control. In the figure, U is a controller (control unit) that is configured by using a microcomputer. It will be appreciated that the controller U includes a processor 60 having associated volatile memory 61 (e.g., RAM) and non-volatile memory 62 (e.g., ROM or flash memory). Program instructions such as a NO$_x$ reduction control program 63 are stored in the non-volatile memory 62 and executed via the processor 60 using portions of the volatile memory 61 in order to achieve the various functions of the controller U described herein. Signals at least from various sensors S1 to S6 are input to the controller U. S1 is an intake air amount sensor for detecting the intake air amount and is arranged immediately on the downstream side of the air cleaner 21 on the intake passage 20, for example. S2 is a rotation speed sensor for detecting the engine speed. S3 is a load sensor for detecting the engine load (i.e., the accelerator opening degree).

S4 is an air-fuel ratio sensor (e.g., oxygen sensor) for detecting the air-fuel ratio of exhaust gas and is arranged immediately on the downstream side of the DPF 42 on the exhaust passage 40 in this embodiment; however, the air-fuel sensor S4 might be arranged immediately on the downstream side or immediately on the upstream side of the $NO_x$ catalyst 41. S5 is a temperature sensor for detecting the exhaust gas temperature and is arranged on the upstream side of the opening position of the EGR passage 50 on the exhaust passage 40, for example. S6 is a turbocharging pressure sensor and is provided on the surge tank 26, for example. The controller U controls the fuel injection valve 10, the air amount control valve 25, and the EGR valves 52 and 54. Moreover, the target air-fuel ratio during the $DeNO_x$ control is feedback controlled so as to achieve the target air-fuel ratio (in the region) by setting λ (excess air ratio) to, for example, 0.96 and using the air-fuel ratio sensor S4. Further, regarding the feedback control, a region from λ=0.96, at which the air-fuel ratio of the exhaust gas achieves the target air-fuel ratio, to λ=1, at which the air-fuel ratio of exhaust gas achieves the stoichiometric air-fuel ratio, is an allowable region. Furthermore, the reduction execution region shown in FIG. 2 is stored in the controller U (memory) in advance.

Next, the control contents of the controller U will be described with reference to the flowchart in FIG. 5. Moreover, "Q" refers to steps in the following description. First, at Q1, it is determined whether or not engine operation is within the reduction execution region shown in FIG. 2 based on the current engine speed and the engine load. When the determination at Q1 is YES, an execution flag of the $DeNO_x$ control is set to one at Q2.

After Q2, it is determined whether or not the engine is operating in the low load region within the reduction execution region shown in FIG. 2 at Q3. When the determination at Q3 is YES, at Q4, by reducing the air amount by controlling the air amount control valve 25 to the closing valve direction, the air-fuel ratio of exhaust gas is feedback controlled to achieve the target air-fuel ratio.

After Q4, at Q5, the opening degree of the control valve 29 is controlled so as to achieve the target turbocharging pressure according to the operating state of the engine (turbocharging pressure control). After this, at Q6, the post injection is executed in addition to the main injection.

After Q6, at Q7, it is determined whether the $NO_x$ occluded amount in the $NO_x$ catalyst 41 is reduced approximately down to zero or not. When the determination at Q7 is NO, the process returns to Q3. When the determination at Q7 is YES, the $NO_x$ reduction control is terminated, at Q8, the process returns to the start after resetting the $DeNO_x$ execution flag to zero.

When the determination at Q3 is NO, the engine is operating in the high load region within the reduction execution region shown in FIG. 2. At this time, at Q9, it is determined whether or not the turbocharging pressure is converged around the target turbocharging pressure and also whether the air-fuel ratio of the exhaust gas is converged around the target air-fuel ratio. When the determination at Q9 is NO, the process proceeds to Q4 (the state of waiting for that the turbocharging pressure to converge around the target turbocharging pressure and also the air-fuel ratio of exhaust gas to converge around the target air-fuel ratio).

When the determination at Q9 is YES, at Q10, the air amount control valve 25 is fully opened. After this, at Q11, it is feedback controlled so that the air-fuel ratio of exhaust gas achieves the target air-fuel ratio by the turbocharging pressure control by controlling the control valve 29. After this, at Q12, the main injection and the post injection are executed.

After Q12, at Q13, it is determined whether or not overshoot of the turbocharging pressure is generated. When the determination at Q13 is NO, the process proceeds to Q7. Moreover, when the determination at Q13 is YES, at Q14, the air amount is reduced by controlling the air amount control valve 25 to the closing valve direction.

After Q14, at Q15, it is determined whether or not the air-fuel ratio of exhaust gas is in a region between the target air-fuel ratio and the stoichiometric air-fuel ratio. When the determination at Q15 is NO, the process proceeds to Q7. Moreover, when the determination at Q15 is YES, the post injection amount is reduced at Q16.

When the determination at Q1 is NO, it is a time that the $DeNO_x$ control is not executed, in this case, at Q17, the main injection is executed (no post injection).

Figure 5:
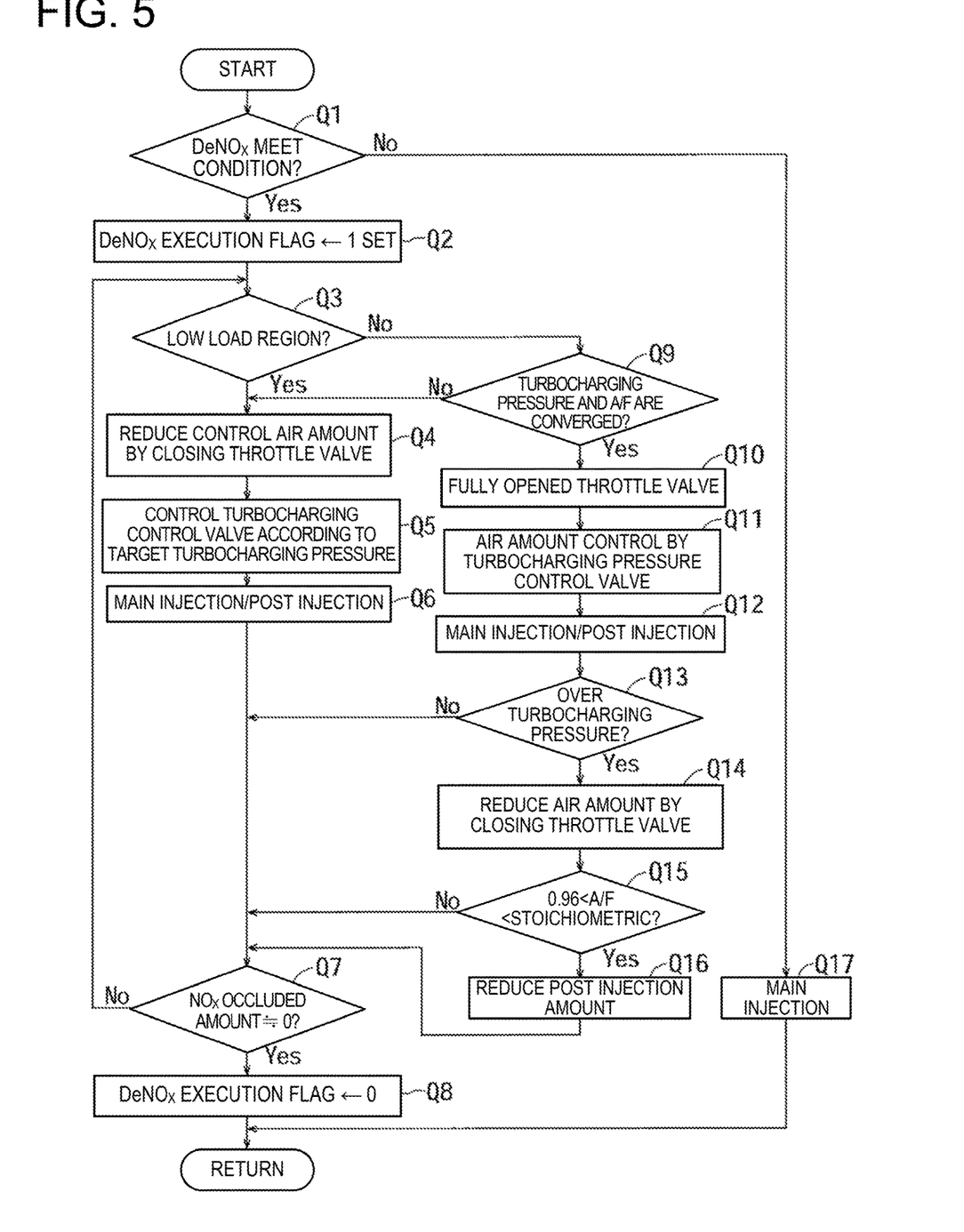
FIG. 5 is a flow chart showing a control example of the present invention.
Figure 6:
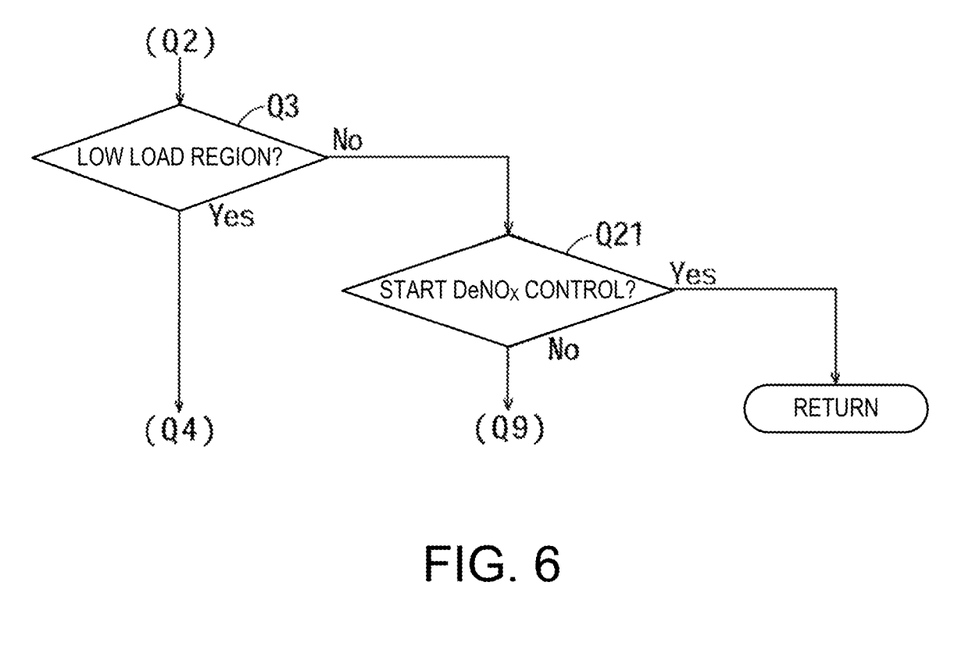
FIG. 6 is a flow chart showing another control example of the present invention.

FIG. 6 shows another control example of the present invention that adds a process step Q21 between Q3 and Q9 in the control example in FIG. 5. The control context shown in FIG. 6 is that the $DeNO_x$ control is a process that always starts from the low load region but does not start from the high load region. When the $DeNO_x$ control is started by the air amount control by the turbocharging pressure control, a response lag to achieve the target air-fuel ratio becomes fairly large. Therefore, the start of the $DeNO_x$ control is executed from the air amount control by the air amount control valve 25, by which the response lag is very small.

Specifically, the determination at Q3 in FIG. 6 is NO (when in the high load region), at Q21, it is determined whether or not the $DeNO_x$ control is started. The determination at Q21 determines whether it is a case that the $DeNO_x$ control is started from the high load region or not (in other words, this determination might be also a determination of whether the change is from the state that the $DeNO_x$ control is executed in the low load region or not). When the determination at Q21 is YES, the process returns as it is so as to prohibit the $DeNO_x$ control. Moreover, when the determination at Q21 is NO, the processes following Q9 in FIG. 5 are executed. Furthermore, the determination at Q21 might also determine whether the $DeNO_x$ control in the low load region is continuously executed or not for a prescribed time or more.

Although the above embodiments were described, the present invention is not limited to these embodiments, and can be changed properly within the scope of the matters recited by the claims. For example, the present invention includes the following cases. The engine 1 might be a gasoline engine. The turbocharger might be provided with only one charger, and also it might be a variable vane type instead of a wastegate valve type. Each step or step groups in the flowchart show functions that the controller U has, and the configuration elements that the controller U has can be comprehended by adding "means" or "program" to the names of the functions. The feedback control when the air-fuel ratio of exhaust gas achieves the target air-fuel ratio is not executed within a region between the stoichiometric air-fuel ratio and the target air-fuel ratio that is richer than that as the allowable region, but might instead be executed by turning on/off at a point of the stoichiometric air-fuel ratio. Of course, the purpose of the present invention is not limited to those described, but implicitly includes providing preferable or practically preferable embodiments, and such embodiments can be understood as a control method.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

INDUSTRIAL APPLICABILITY

The present invention is suitable to be applied to a diesel engine for an automobile, for example.

EXPLANATION OF REFERENCE CHARACTERS

U: Controller
S2: Rotation speed sensor
S3: Load sensor
S4: Air-fuel ratio sensor
S5: Temperature sensor (For detecting exhaust gas temperature)
S6: Turbocharging pressure sensor
1: Engine
2: Cylinder (Cylinder)
10: Fuel injection valve
20: Intake passage
22: Large turbocharger
22a: Compressor wheel
22b: Turbine wheel
23: Small turbocharger
23a: Compressor wheel
23b: Turbine wheel
25: Air amount control valve
40: Exhaust passage
41: $NO_x$ catalyst
50: EGR (exhaust gas recirculation) passage
52: EGR valve
54: EGR valve

We claim:

1. An exhaust purification device of an engine, comprising:
   a fuel injection valve for supplying fuel to the engine;
   an air amount control valve for adjusting an air amount supplied to the engine;
   a turbocharger;
   a turbocharge control valve for adjusting the air amount by adjusting a turbocharging state of the turbocharger;
   a $NO_x$ catalyst provided on an exhaust passage of the engine for occluding $NO_x$ in exhaust gas when an air-fuel ratio of the exhaust gas is in a leaner state than a stoichiometric air-fuel ratio and for reducing the occluded $NO_x$ when the air-fuel ratio of the exhaust gas is in the vicinity of the stoichiometric air-fuel ratio or in a richer state than the stoichiometric air-fuel ratio; and
   a processor that executes a $NO_x$ reduction control program that performs a $NO_x$ reduction control that sets the air-fuel ratio of the exhaust gas to a target air-fuel ratio at which the occluded $NO_x$ in the $NO_x$ catalyst is reducible and reduces the occluded $NO_x$ in the $NO_x$ catalyst, when a $NO_x$ reduction condition is met;
   wherein the $NO_x$ reduction condition is set to be when an operating state of the engine is in a reduction execution region that is determined at least based on an engine load, the reduction execution region being divided into a low load region and a high load region in advance; and
   wherein the $NO_x$ reduction control program controls the air-fuel ratio of the exhaust gas to achieve the target air-fuel ratio by adjusting the air amount with the air amount control valve when the engine load is in the low load region, and controls the air-fuel ratio of the exhaust gas to achieve the target air-fuel ratio by adjusting the air amount with the turbocharge control valve when the engine load is in the high load region.

2. The exhaust purification device of an engine according to claim 1,
   wherein the $NO_x$ reduction control program maintains the air amount control valve fully opened when the engine load is in the high load region, and performs a control to reduce the air amount by controlling the air amount control valve to move in a valve closing direction when the engine load is in the high load region and a turbocharging pressure is equal to or greater than a predetermined value above a target turbocharging pressure, which is set according to the operating state of the engine.

3. The exhaust purification device of an engine according to claim 1,
   wherein the $NO_x$ reduction control program performs a post injection, which is a fuel injection in an expansion stroke, by the fuel injection valve, and also performs a control to reduce a post injection amount of the post injection when the engine load is in the high load region and a turbocharging pressure is equal to or greater than a predetermined value above a target turbocharging pressure, which is set according to the operating state of the engine.

4. The exhaust purification device of an engine according to claim 3,
   wherein the $NO_x$ reduction control program performs the reduction of the post injection amount when the engine load is in the high load region and also the turbocharging pressure is equal to or greater than the predetermined value above the target turbocharging pressure, on a condition that the air-fuel ratio of the exhaust gas is leaner than the target air-fuel ratio.

5. The exhaust purification device of an engine according to claim 4,
   wherein the $NO_x$ reduction control program performs the reduction of the post injection amount when the engine load is in the high load region and also the turbocharging pressure is equal to or greater than the predetermined value above the target turbocharging pressure, on a condition that the air-fuel ratio of the exhaust gas is leaner than the target air-fuel ratio and richer than a stoichiometric air-fuel ratio.

* * * * *